United States Patent
Reddem

(10) Patent No.: US 11,533,308 B2
(45) Date of Patent: Dec. 20, 2022

(54) SYSTEMS AND METHODS FOR SUPPORTING UNAUTHENTICATED POST REQUESTS THROUGH A REVERSE PROXY ENABLED FOR AUTHENTICATION

(71) Applicant: Citrix Systems, Inc., Fort Lauderdale, FL (US)

(72) Inventor: Dileep Reddem, San Jose, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 210 days.

(21) Appl. No.: 16/922,483

(22) Filed: Jul. 7, 2020

(65) Prior Publication Data
US 2022/0014521 A1    Jan. 13, 2022

(51) Int. Cl.
*H04L 29/06*    (2006.01)
*H04L 9/40*    (2022.01)

(52) U.S. Cl.
CPC ...... *H04L 63/0884* (2013.01); *H04L 63/0281* (2013.01)

(58) Field of Classification Search
CPC .................. H04L 63/0884; H04L 63/0281
See application file for complete search history.

(56) References Cited

U.S. PATENT DOCUMENTS

| | | | |
|---|---|---|---|
| 6,956,870 B1 * | 10/2005 | Charriere | H04L 49/108 370/470 |
| 10,289,857 B1 | 5/2019 | Brinskelle | |
| 2003/0040995 A1 * | 2/2003 | Daddario | G06Q 40/00 705/37 |
| 2011/0041171 A1 * | 2/2011 | Burch | H04L 63/0884 709/229 |

FOREIGN PATENT DOCUMENTS

| | | |
|---|---|---|
| CA | 2875255 A1 | 12/2013 |
| WO | WO-2019/207272 A1 | 10/2019 |

OTHER PUBLICATIONS

International Search Report on PCT Appl. No. PCT/US2021/040473 dated Oct. 8, 2021.

* cited by examiner

*Primary Examiner* — Vance M Little
(74) *Attorney, Agent, or Firm* — Foley & Lardner LLP

(57) ABSTRACT

Systems and methods for supporting unauthenticated POST requests include a device arranged intermediary to a client and a server which receives an unauthenticated HTTP POST request from the client for the server. The unauthenticated HTTP POST request may include a body. The device may generate one more data objects for the body of the unauthenticated HTTP POST request. The device may transmit a request to cause an authentication of a user to the client. The request may include the data object(s) to be stored on the client. The device may receive an HTTP GET request including the data object(s) from the client responsive to authenticating the user. The device may generate an authenticated HTTP POST request corresponding to the unauthenticated HTTP POST request using the one or more data objects included in the HTTP GET request. The device may transmit the authenticated HTTP POST request to the server.

20 Claims, 9 Drawing Sheets

SYSTEMS AND METHODS FOR SUPPORTING UNAUTHENTICATED POST REQUESTS THROUGH A REVERSE PROXY ENABLED FOR AUTHENTICATION

FIELD OF THE DISCLOSURE

The present application generally relates to reverse proxy devices including but not limited to systems and methods for supporting unauthenticated POST requests through a reverse proxy enabled for authentication.

BACKGROUND

Various clients may generate requests for a server or service. Some requests may be HTTP requests. The HTTP request may be an HTTP POST request, an HTTP GET request, etc. Additionally, some servers or services may require authentication of a user of the client.

SUMMARY

This Summary is provided to introduce a selection of concepts in a simplified form that is further described below in the Detailed Description. This Summary is not intended to identify key features or essential features, nor is it intended to limit the scope of the claims included herewith.

Systems and methods for supporting unauthenticated POST requests are described herein. More particularly, the systems and methods described herein may support unauthenticated POST requests through a reverse proxy enabled for authentication.

In various network environments, intermediary devices may be used as a reverse proxy for clients or servers. Some intermediary devices may provide an authentication function to clients and/or servers. For instance, an application delivery controller, such as Citrix's NETSCALER appliance, when deployed as a reverse proxy, can be configured to provide an AAA feature, which supports authentication, authorization, and auditing for all application traffic. When the AAA feature is enabled, or more generally, when an intermediary device provides an authentication function, any unauthorized, unauthenticated access (such as POST or GET requests) to backend server is not permitted. Whenever an unauthenticated request is identified by the intermediary device (or a traffic management virtual server), the intermediary device may redirect the user for performing authentication (to an authentication virtual server). Once the user is authenticated, the user is given access to the backend server. However, when the unauthenticated request is an unauthenticated POST request, a post body of the unauthenticated POST request may be lost as a result of the redirect for authentication. One possible implementation of conserving the post body of an unauthenticated POST request is by storing the post body locally at the intermediary device while the user is authenticated. However, storing arbitrary data on the intermediary device may lead to various security attacks. Also, since an intermediary device may function as a proxy for a plurality of clients, storing a post body for unauthenticated POST requests may be expensive in terms of memory.

According to the embodiments described herein, a device may receive an unauthenticated HTTP POST request from a client for the server. The unauthenticated HTTP POST request may include a body. The device may generate one or more data objects for the body of the unauthenticated HTTP POST request. The device may transmit a request to cause an authentication of the user. The request may include the one or more data objects to be stored on the client. The device may receive an HTTP GET request from the client responsive to authenticating the user. The HTTP GET request may include the one or more data objects stored on the client. The device may generate an authenticated HTTP POST request corresponding to the unauthenticated HTTP POST request using the one or more data objects included in the HTTP GET request. The device may transmit the authenticated HTTP POST request to the server.

According to the implementations and embodiments described herein, the present disclosure maintains the post body corresponding to an unauthenticated HTTP POST request while the user authenticates themselves, thereby eliminating redundancy in generating the post body of the HTTP POST request. Additionally, the implementations and embodiments described herein provide a more secure way of conserving data corresponding to HTTP POST request by having data corresponding to the post body stored at the client (rather than at the intermediary device). The implementations and embodiments described herein reduce the likelihood of an attack at the intermediary device by off-loading data storage corresponding to the HTTP POST request to the client which generated the HTTP POST request. Various other benefits of the systems and methods described herein will become apparent as follows.

In one aspect, this disclosure is directed to a method. The method includes receiving, by a device intermediary to a client and a server, from the client, an unauthenticated HTTP POST request for the server. The unauthenticated HTTP POST request may include a body. The method includes generating, by the device, one more data objects for the body of the unauthenticated HTTP POST request. The method includes transmitting, by the device, to the client, a request to cause an authentication of a user. The request may include the one or more data objects to be stored on the client. The method includes receiving, by the device, responsive to authenticating the user, from the client, an HTTP GET request including the one or more data objects stored on the client. The method includes generating, by the device, an authenticated HTTP POST request corresponding to the unauthenticated HTTP POST request using the one or more data objects included in the HTTP GET request. The method includes transmitting, by the device, to the server, the authenticated HTTP POST request.

In some embodiments, the method further includes determining, by the device, based on the unauthenticated HTTP post request, that the user is unauthenticated. Generating the one or more data objects and transmitting the request may be performed responsive to determining that the user is unauthenticated. In some embodiments, the method further includes storing, by the device, in memory of the device, context data including a session identifier corresponding to the unauthenticated HTTP POST request and an indicator indicating that the unauthenticated HTTP POST request is an HTTP POST request. In some embodiments, the HTTP GET request includes a parameter received responsive to authenticating the user, the parameter corresponding to the context data and used to generate the authenticated HTTP POST request. In some embodiments, the request to cause the authentication of the user is a first request. The method may further include receiving, by the device from the client, responsive to the request to cause the authentication of the user, one or more credentials for authenticating the user. The method may further include authenticating, by the device, the user based on the one or more credentials.

In some embodiments, the unauthenticated HTTP POST request identifies an information resource. The method may further include generating, by the device, responsive to authenticating the user, a request to redirect the client to the information resource identified in the unauthenticated HTTP POST request. The method may further include transmitting, by the device, to the client, the request to cause the client to be redirected to the information resource. In some embodiments, the request to cause the authentication of the user includes a parameter which indicates that the device is to generate the authenticated HTTP POST request from the HTTP GET request. In some embodiments, the one or more data objects is a plurality of data objects. The body of the unauthenticated HTTP POST request may have a size which exceeds a maximum size of a data object of the plurality of data objects. Generating the plurality of data objects may include dividing, by the device, the body of the unauthenticated HTTP POST request into the plurality of data objects. In some embodiments, the plurality of data objects is a plurality of cookies. The method may further include setting, by the device, the plurality of cookies on a browser of the client. In some embodiments, generating the authenticated HTTP POST request comprises modifying, by the device, an identifier of the HTTP GET request which corresponds to HTTP GET requests to an identifier which corresponds to HTTP POST requests.

In another aspect, this disclosure is directed to a system. The system includes a device intermediary to a client and a server. The device may be configured to receive, from the client, an unauthenticated HTTP POST request for the server. The unauthenticated HTTP POST request may include a body. The device may be configured to generate one more data objects for the body of the unauthenticated HTTP POST request. The device may be configured to transmit, to the client, a request to cause an authentication of a user. The request may include the one or more data objects to be stored on the client. The device may be configured to receive, responsive to authenticating the user, from the client, an HTTP GET request including the one or more data objects stored on the client. The device may be configured to generate an authenticated HTTP POST request corresponding to the unauthenticated HTTP POST request using the one or more data objects included in the HTTP GET request. The device may be configured to transmit the authenticated HTTP POST request to the server.

In some embodiments, the device is further configured to determine, based on the unauthenticated HTTP post request, that the user is unauthenticated. Generating the one or more data objects and transmitting the request may be performed responsive to determining that the user is unauthenticated. In some embodiments, the device is further configured to store, in memory of the device, context data including a session identifier corresponding to the unauthenticated HTTP POST request and an indicator indicating that the unauthenticated HTTP POST request is an HTTP POST request. In some embodiments, the HTTP GET request includes a parameter received responsive to authenticating the user, the parameter corresponding to the context data and used to generate the authenticated HTTP POST request. In some embodiments, the request to cause the authentication of the user is a first request. The device may be further configured to receive, from the client, responsive to the request to cause the authentication of the user, one or more credentials for authenticating the user, and authenticate the user based on the one or more credentials.

In some embodiments, the unauthenticated HTTP POST request identifies an information resource. The device may be configured to generate, responsive to authenticating the user, a request to redirect the client to the information resource identified in the unauthenticated HTTP POST request. The device may be configured to transmit, to the client, the request to cause the client to be redirected to the information resource. In some embodiments, the request to cause the authentication of the user includes a parameter which indicates that the device is to generate the authenticated HTTP POST request from the HTTP GET request. In some embodiments, the one or more data objects is a plurality of data objects. The body of the unauthenticated HTTP POST request may have a size which exceeds a maximum size of a data object of the plurality of data objects. Generating the plurality of data objects may include dividing the body of the unauthenticated HTTP POST request into the plurality of data objects. In some embodiments, the plurality of data objects is a plurality of cookies. The device may further be configured to set the plurality of cookies on a browser of the client.

In still another aspect, this disclosure is directed to a non-transitory computer readable medium storing program instructions for causing one or more processors to receive, from a client, an unauthenticated HTTP POST request for a server. The unauthenticated HTTP POST request may include a body. The instructions may cause the processors to generate one more data objects for the body of the unauthenticated HTTP post request. The instructions may cause the processors to transmit, to the client, a request to cause an authentication of a user. The request may include the one or more data objects to be stored on the client. The instructions may cause the processors to receive, responsive to authenticating the user, from the client, an HTTP GET request including the one or more data objects stored on the client. The instructions may cause the processors to generate an authenticated HTTP POST request corresponding to the unauthenticated HTTP post request using the one or more data objects included in the HTTP GET request. The instructions may cause the processors to transmit, to the server, the authenticated HTTP POST request.

BRIEF DESCRIPTION OF THE DRAWINGS

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, with emphasis instead being placed upon illustrating embodiments, principles, and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for providing a clustered appliance architecture environment;

Section D describes embodiments of systems and methods for providing a clustered appliance architecture environment; and Section E describes embodiments of systems and methods for supporting unauthenticated POST requests.

A. Network and Computing Environment

Figure 1A:
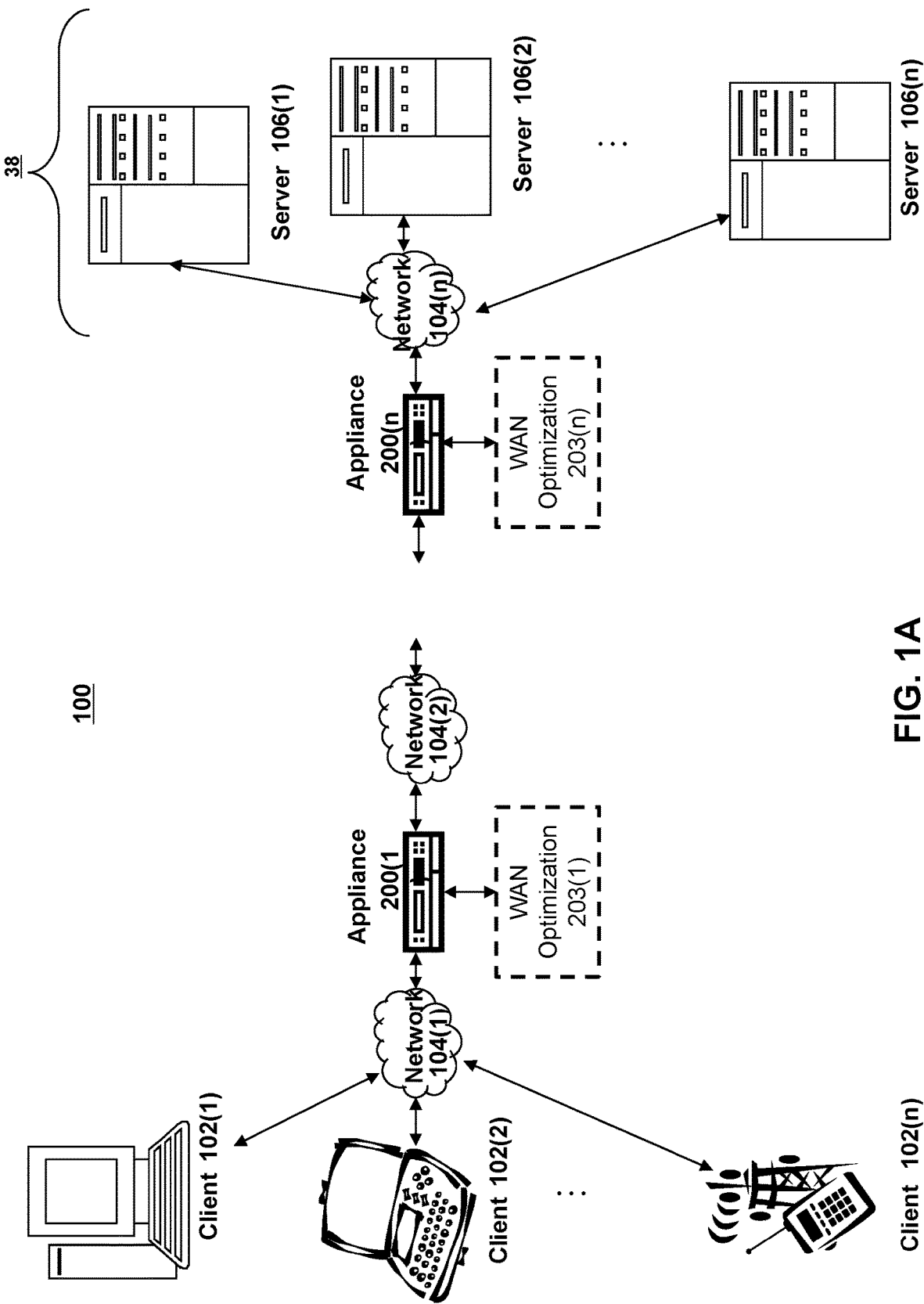
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
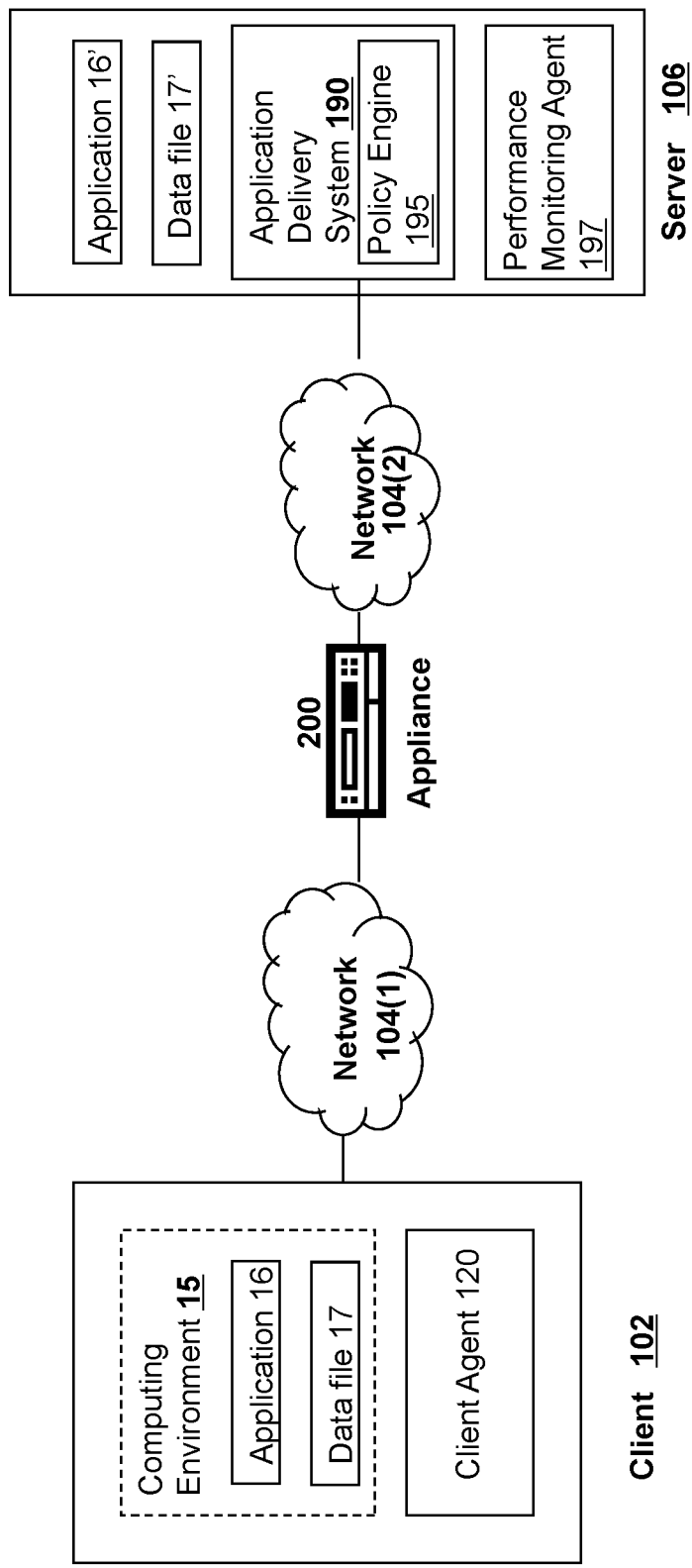
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
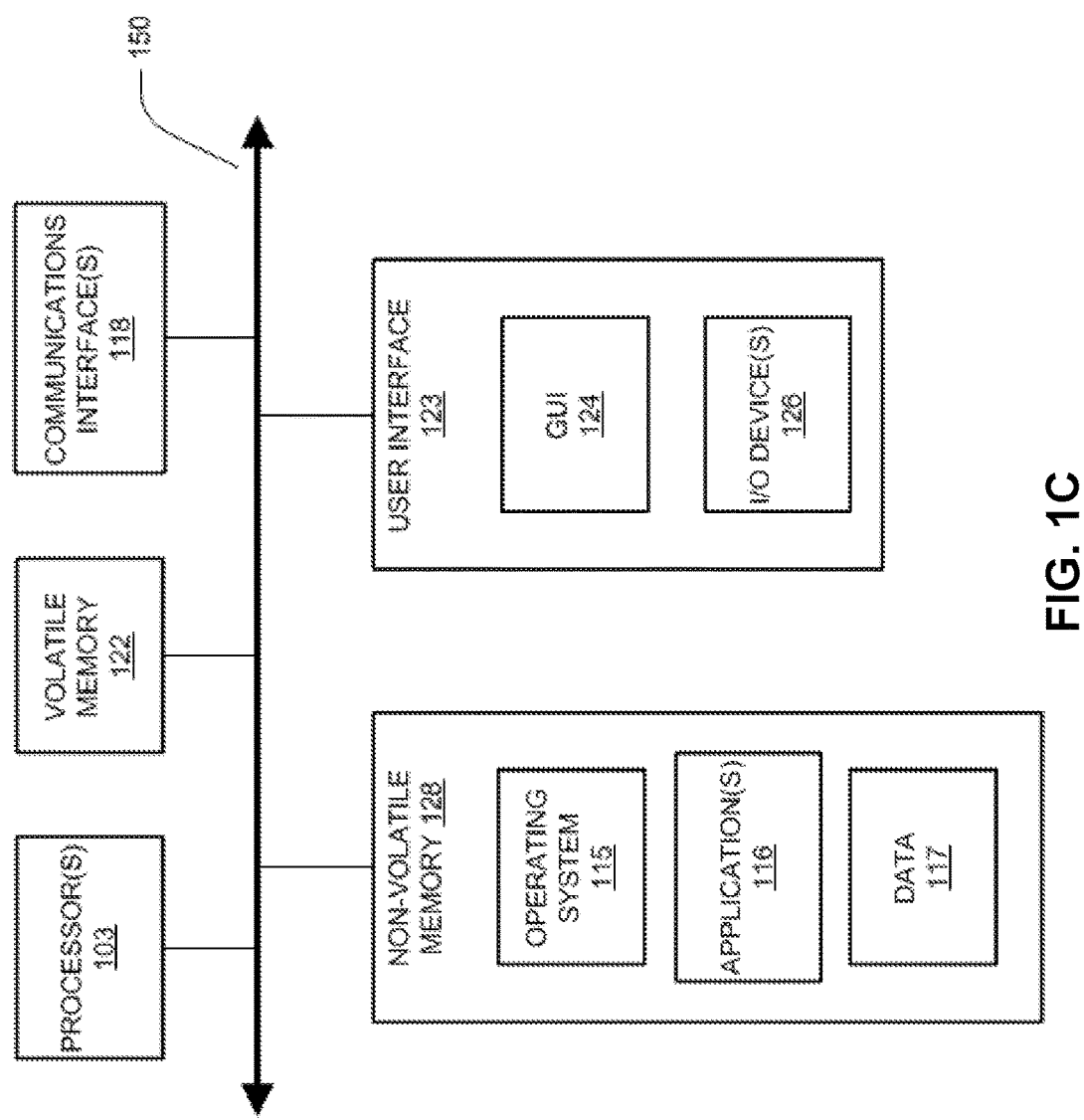
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
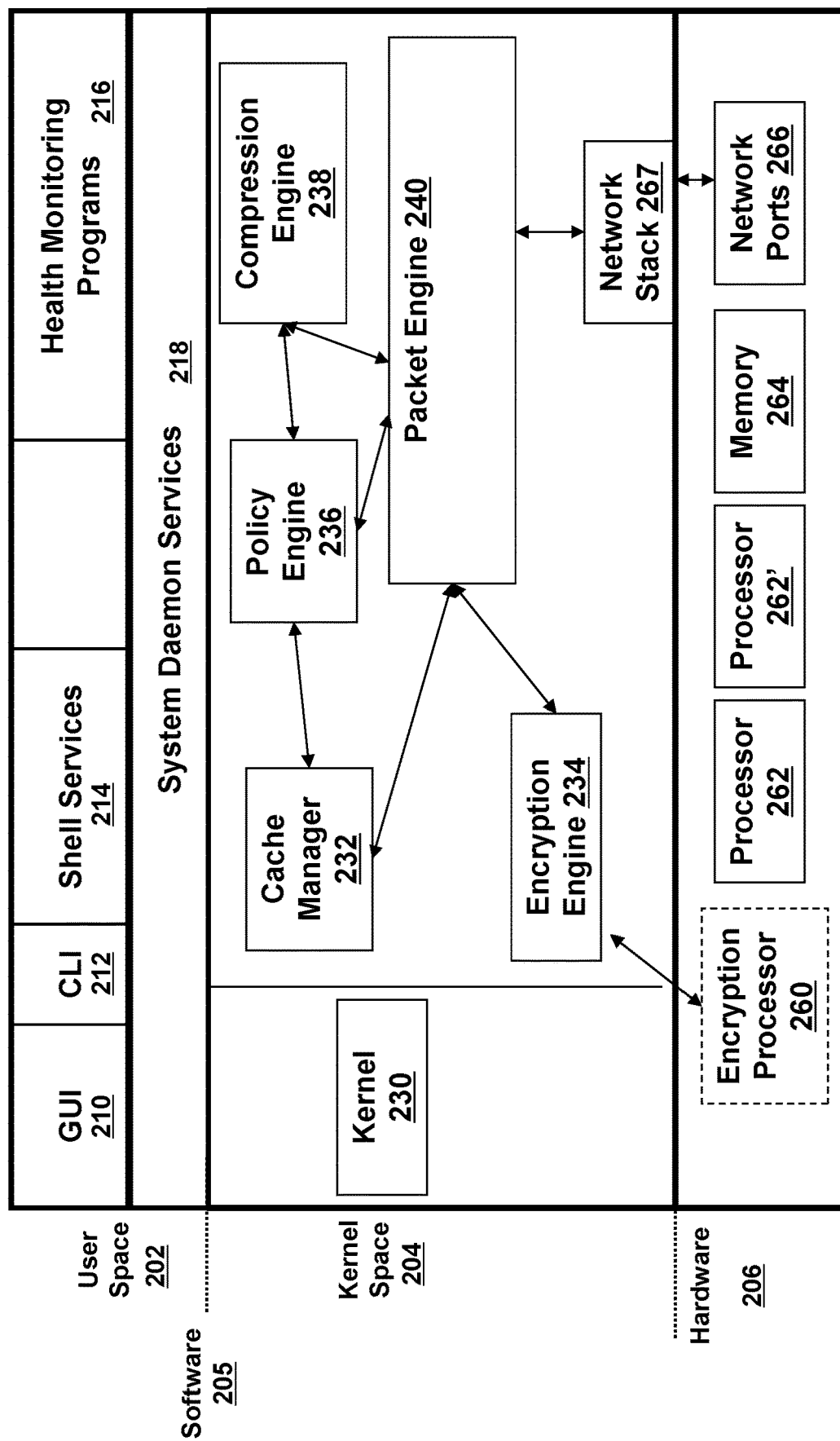
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Virtualizing an Application Delivery Controller

Figure 3:
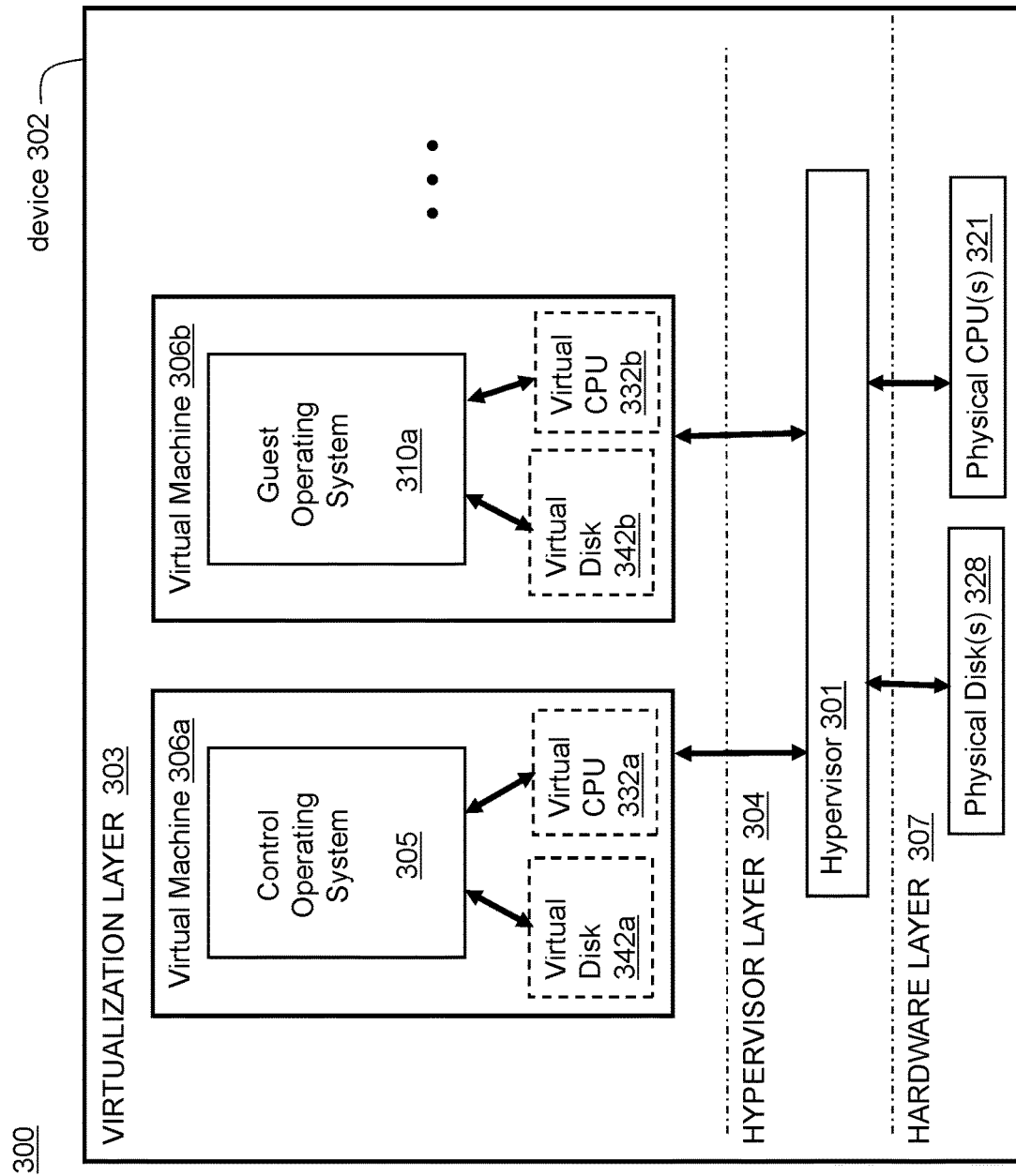
FIG. 3 is a block diagram of a virtualization environment, in accordance with an illustrative embodiment.

Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, Fla. In an illustrative embodiment, device 302 executing a hypervisor that creates a virtual machine platform on which guest operating systems may execute is referred to as a host server. 302

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

D. Systems and Methods for Providing a Distributed Cluster Architecture

Figure 4:
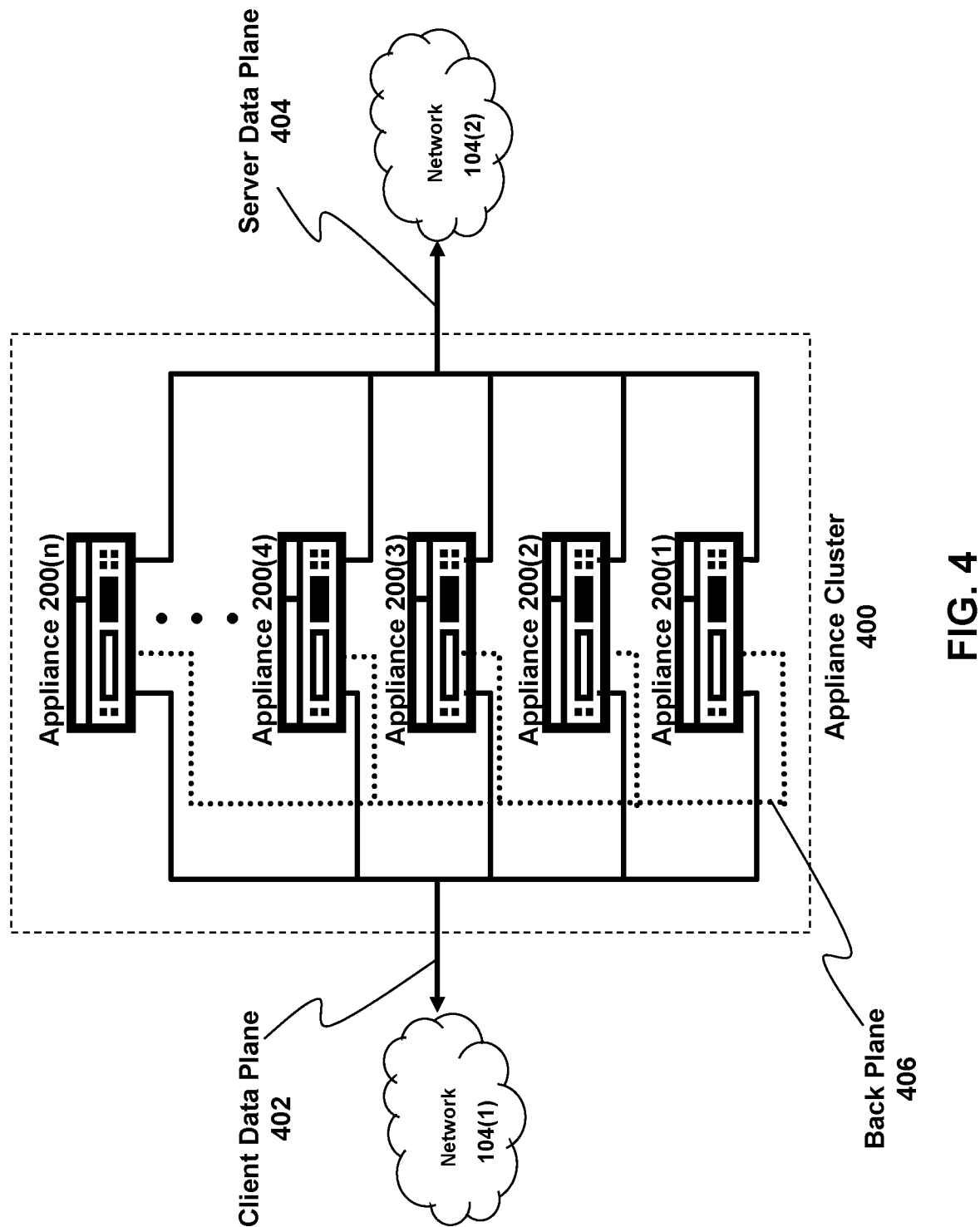
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

E. Systems and Methods for Supporting Unauthenticated POST Requests

Systems and methods for supporting unauthenticated POST requests are described herein. More particularly, the systems and methods described herein may support unauthenticated POST requests through a reverse proxy enabled for authentication.

In various network environments, intermediary devices (such as an appliance 200 described above) may be used as a reverse proxy for clients or servers. Some intermediary devices may provide an authentication function to clients and/or servers. When an intermediary device provides an authentication function, any unauthorized, unauthenticated access (such as POST or GET requests) to a backend server is not permitted. Whenever an unauthenticated request is identified by the intermediary device, the intermediary device may redirect the user for performing authentication. Once the user is authenticated, the user is given access to the backend server. However, when the unauthenticated request is an unauthenticated POST request, a post body of the unauthenticated POST request may be lost as a result of the redirect for authentication. One possible implementation of conserving the post body of an unauthenticated POST request is by storing the post body locally at the intermediary device while the user is authenticated. However, storing arbitrary data on the intermediary device may lead to various security attacks. Also, since an intermediary device may function as a proxy for a plurality of clients, storing a post body for unauthenticated POST requests may be expensive in terms of memory.

According to the embodiments described herein, a device may receive an unauthenticated HTTP POST request from a client for the server. The unauthenticated HTTP POST request may include a body. The device may generate one or more data objects for the body of the unauthenticated HTTP POST request. The device may transmit a request to cause an authentication of the user. The request may include the one or more data objects to be stored on the client. The device may receive an HTTP GET request from the client responsive to authenticating the user. The HTTP GET request may include the one or more data objects stored on the client. The device may generate an authenticated HTTP POST request corresponding to the unauthenticated HTTP POST request using the one or more data objects included in the HTTP GET request. The device may transmit the authenticated HTTP POST request to the server.

According to the implementations and embodiments described herein, the present disclosure maintains the post body corresponding to an unauthenticated HTTP POST request while the user authenticates themselves, thereby eliminating redundancy in generating the post body of the HTTP POST request. Additionally, the implementations and embodiments described herein provide a more secure way of conserving data corresponding to HTTP POST request by having data corresponding to the post body stored at the client (rather than at the intermediary device). The implementations and embodiments described herein reduce the likelihood of an attack at the intermediary device by off-loading data storage corresponding to the HTTP POST request to the client which generated the HTTP POST request. Various other benefits of the systems and methods described herein will become apparent as follows.

Figure 5:
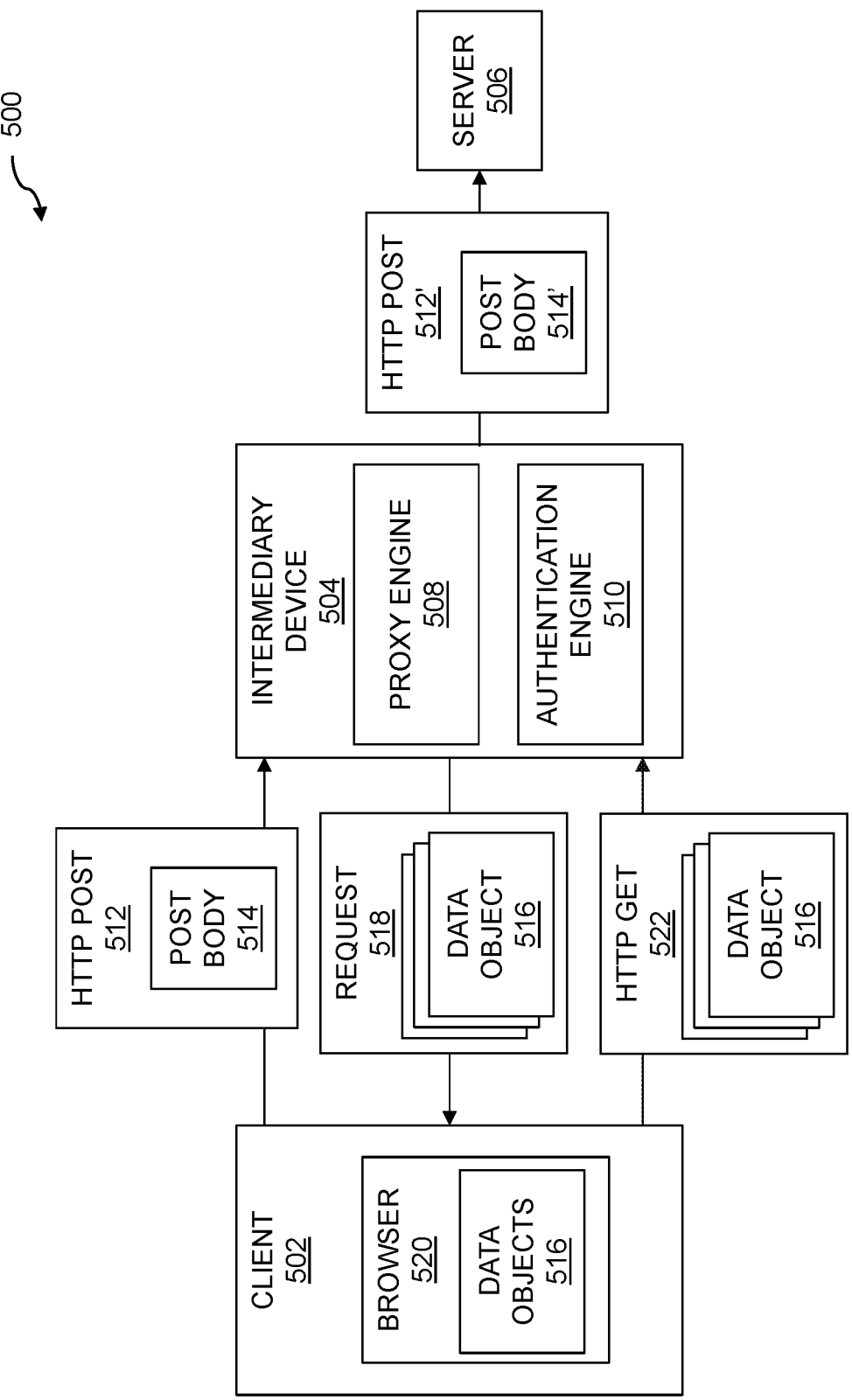
FIG. 5 is a block diagram of a system for supporting unauthenticated POST requests, in accordance with an illustrative embodiment.

Referring now to FIG. 5, depicted is a block diagram of a system 500 for managing unauthenticated POST requests, according to an illustrative embodiment. The system 500 is shown to include a client 502, an intermediary device 504, and a server 506. The intermediary device 504 may be arranged intermediate the client 502 and server 506. The intermediary device 504 may be configured to receive an HTTP POST request 512 from the client 502. The HTTP POST request 512 may be an unauthenticated HTTP POST request 512 and may include a post body 514. The post body 514 refers to a body section of an HTTP POST request 512. The intermediary device 504 may be configured to generate one or more data objects 516 for the post body 514 of the HTTP POST request 512. The intermediary device 504 may be configured to transmit a request 518 to the client 502 to cause an authentication of the user. The request 518 may include the data objects 516 generated by the intermediary device 504 for storage at the client 502. The intermediary device 504 may be configured to receive an HTTP GET request 522 from the client 502 responsive to authenticating the user. The HTTP GET request 522 may include the data object(s) 512 generated by the intermediary device 504 and included in the request 518 to the client 502. The intermediary device 504 may be configured to generate an HTTP POST request 512' corresponding to the HTTP POST request 512 using the data object(s) 512 included in the HTTP GET request 522. As such, the HTTP POST request 512' may include a post body 514' which is substantially the same as the post body 514 of the HTTP POST request 512. The intermediary device 504 may be configured to transmit the HTTP POST request 512' to the server 506.

The systems and methods of the present solution may be implemented in any type or form of device, including clients, servers or appliances described above with reference to FIG. 1A-FIG. 4. For instance, the intermediary device 504 may be implemented as embodied upon or otherwise incorporated into an appliance 200 described above with reference to FIG. 2-FIG. 4. The clients 502 may be similar in some respects to the clients 102 described above with respect to FIG. 1A-FIG. 1B. The server 506 may be similar in some respects to the server 106 described above with respect to FIG. 1A-FIG. 1B. In other words, the clients 502, intermediary devices 504, and servers 506 may include or incorporate components and devices similar in some aspects to those described above with reference to FIG. 1C, such as a memory and/or one or more processors operatively coupled to the memory. The present systems and methods may be implemented in any embodiments or aspects of the appliances or devices described herein.

The system 500 may include the intermediary device 504. The intermediary device 504 may be communicably coupled to the client 502 and server 506. In some embodiments, the intermediary device 504 may be communicably coupled to a plurality of clients 502 and a plurality of servers 506. In some embodiments, the intermediary device 504 may serve as a proxy for the client(s) 502 to the server(s) 506. For example, the intermediary device 504 may include a proxy engine 508. The proxy engine 508 may be any device(s), component(s), script, or combination of hardware and software configured to route one or more requests on behalf of a client 502 to a server 506 (and/or vice versa). As described in greater detail below, the proxy engine 508 may route the requests received from one or more clients 502 to the server 506. In some embodiments, the requests may be hypertext transfer protocol (HTTP) requests, such as an HTTP POST request, an HTTP GET request, etc.

In some instances, some servers 506 and/or services executing on a server 506 may require authentication prior to the client 502 accessing the server 506 and/or service. In such instances, the client 502 may be prompted to authenticate themselves prior to accessing the server 506 and/or service. In some embodiments, the intermediary device 504 may include an authentication engine 510. The authentication engine 510 may be any device(s), component(s) script, or combination of hardware and software configured to authenticate a user. While the proxy engine 508 and authentication engine 510 are shown as being included on the same intermediary device 504, it is noted that, in some embodiments, the system 500 may include one or more intermediary devices 504 for authentication and one or more intermediary devices 504 which serve as a proxy for the clients 502. Additionally, in some embodiments, a plurality of intermediary devices 504 may both authenticate and serve as a proxy for various clients 502.

In some embodiments, the intermediary device 504 may be configured to receive an HTTP POST request 512 for the server 506 from the client 502. The HTTP POST request 512 may include a body 514 which is to be stored, saved, accepted, provided, or otherwise posted to the server 506. In some embodiments, the proxy engine 508 of the intermediary device 504 may be configured to receive the HTTP POST request 512. The proxy engine 508 may be configured to parse the HTTP POST request 512 to determine a destination for the HTTP POST request 512. For example, the HTTP POST request 512 may include an address associated with an information resource of the server 506 (e.g., in the header, among other information or data included in the HTTP POST request 512). The proxy engine 508 may be configured to parse the HTTP POST request 512 to determine or identify the target for the HTTP POST request 512.

HTTP POST requests are designed to be used by the browser to make complex requests on the server. For instance, if a user has just completed a long form, the application might want all of the form's data to be added to a database. The data to be sent back to the server is known as the "message body" or "payload" and can be quite large. The following are example components of an HTTP request:
   Method (required)—(Example: POST)
   Host (required)—(Example: www.example-domain.com)
   Path (required)—(Example: /search)
   HTTP version (required)—(Example: HTTP/2)
   Headers (optional)—(Example: Content-Type: application/json)
   Query String (optional)—(Example: ?q test)
   Body (optional)—(Example: {"q":"test"})

A query string is not the only way to pass additional information to the website. A request body is a means of doing the same. It is typically not used with a GET request but I've added it above for the sake of an example. Typically, it is used with methods such as POST and PUT which are heavier on data transmission as they specify data to be recorded. In the above, after the headers and an empty line, {"q":"test"} is the request body which provides additional information to the website to help it fulfill its request, much like a query string does. Passing data in the body has a few advantages to a query string and a few disadvantages. First, there is no data size limit. Query strings have a maximum size limit (specific to the browser) and therefore aren't good for transmitting a large amount of information. Second, the data is recorded and retrievable in fewer places and is, therefore, more secure. Placing sensitive data, like passwords, in query strings is problematic. Third, the request body is better for sending other data transmission formats, such as JSON and XML. While these formats can be placed in a query string, it isn't typically done. One disadvantage of passing data in the body of the request is that the request body is hidden from the user and cannot be easily shared with another person. Query strings are good for "hey, check out this link" situations since the values are stored in the link and can easily be copy/pasted to another person.

In some embodiments, the proxy engine 508 may be configured to determine whether the server 506 (or information resource) requires authentication of the client 502. The proxy engine 508 may be configured to determine whether the server 506 requires authentication based on the address associated with the server 506, based on known servers 506 or information resources which require authentication, based on a ping transmitted to the server 506 by the intermediary device 504, etc. Where the user is to authenticate themselves prior to accessing the server 506, the proxy engine 508 may be configured to parse the HTTP POST request 512 to determine whether the HTTP POST request 512 is from an authenticated or an unauthenticated user (e.g., whether the HTTP POST request 512 is an authenticated HTTP POST request 512 or an unauthenticated HTTP POST request 512). In some embodiments, the proxy engine 508 may be configured to determine whether the HTTP POST request 512 is an unauthenticated HTTP POST request 512 based on data included in the HTTP POST request 512. For example, the proxy engine 508 may be configured to parse the HTTP POST request 512 to determine whether the HTTP POST request 512 includes a session identifier associated with an authenticated user. Where the HTTP POST request 512 does not include the session identifier, the proxy engine 508 may identify the HTTP POST request 512 as an unauthenticated HTTP POST request 512.

In instances where the HTTP POST request 512 is an unauthenticated HTTP POST request 512 and the server 506 requires authentication, the proxy engine 508 may be configured to cause the client 502 to authenticate. However, where the HTTP request from the client 502 is an HTTP POST request 512 including a body 514, the body 514 may be lost once the client 502 is redirected to authenticate. According to the implementations and embodiments described herein, and as described in greater detail below, the intermediary device 504 may cause the post body 514 to be stored at the client 502 while the user is authenticated. Once the user is authenticated, the intermediary device 504 may be configured to construct an HTTP POST request 512' using the data stored at the client 502. Such implementations and embodiments may conserve the data which would otherwise be lost.

In some embodiments, the intermediary device 504 may be configured to construct, assemble, build, or otherwise generate one or more data objects 516 corresponding to the body 514 of the HTTP POST request 512. In some embodiments, the data objects 516 may be data packets which together form the body 514. The intermediary device 504 may be configured to generate the data objects 516 using data from the body 514. In some embodiments, the data objects 516 may be cookies. For example, the intermediary device 504 may be configured to construct one or more cookies which together are representative of or otherwise include the data from the body 514.

In some embodiments, the data objects 516 may have a size limit or maximum size. For example, a cookie may have a maximum size which is able to be set at a browser 520 (e.g., for specific browser types). In such embodiments, the intermediary device 504 may be configured to compare the POST body 514 to the maximum size of the data object 516. Where the POST body 514 exceeds the maximum size of the data object 516, the intermediary device 504 may be configured to generate a plurality of data objects 516 corresponding to the POST body 514. In some embodiments, the intermediary device 504 may be configured to divide the POST body 514 into a plurality of data objects 516 of equal or substantially equal size, or of different sizes, which are each less than the maximum size of the data object 516. In some embodiments, each data object 516 may include a marker, identifier, or other indicator which is used for reconstructing the POST body 514, as described in greater detail below. For example, where the POST body 514 is separated in a particular order and groupings of data objects 516, each identifier may represent an order in which the data objects 516 are to be re-assembled.

In some embodiments, responsive to determining that the HTTP POST request 512 is an unauthenticated HTTP POST request 512, the proxy engine 508 may be configured to store various data associated with the unauthenticated HTTP POST request 512 in memory of the intermediary device 504. In some embodiments, the proxy engine 508 may be configured to generate and store context data corresponding to the unauthenticated HTTP POST request 512. For example, the proxy engine 508 may be configured to generate and store an identifier which identifies an HTTP request type (e.g., an HTTP POST request, an HTTP GET request, etc.). In some embodiments, the proxy engine 508 may be configured to generate and store a session identifier associated with a connection between the client 502 and intermediary device 504. By storing such context data corresponding to the unauthenticated HTTP POST request 512 while not storing data corresponding to the POST body 514, the intermediary device 504 may preserve the integrity of the system 500 by ensuring that malicious data is not stored or saved on the intermediary device 504, which could potentially compromise the backend server 506, while ensuring that sensitive data is not transmitted to the client 502.

The intermediary device 504 may be configured to send, provide, communicate, or otherwise transmit a request 518 to the client 502 which causes authentication of the user. In some embodiments, the request 518 may be a redirect (such as an HTTP 302 redirect, for example) which causes a browser 520 at the client 502 to redirect to an authentication page (e.g., associated with the authentication engine 510). In some embodiments, the intermediary device 504 may be configured to generate the request 518 to include the data object(s) 516 which correspond to the POST body 514. Hence, the request 518 may include the data objects 516 for storage at the client 502. In some embodiments, the request 518 may redirect the browser 520 to the authentication page and cause the browser 520 to set the data objects 516 as cookies for the browser 520. Accordingly, the data objects 516 may be temporarily stored at the browser 520 while a user associated with the client 502 authenticates themselves at the authentication page associated with the authentication engine 510.

In some embodiments, the request 518 may include a parameter which indicates that the intermediary device 504 is to generate an HTTP POST request 512' corresponding to the unauthenticated HTTP POST request 512. The parameter may indicate that the intermediary device 504 is to generate an HTTP POST request 512' responsive to receiving a subsequent HTTP GET request 522 from the client 502. For instance, once the user authenticates themselves via the authentication page, the client 502 may be configured to generate an HTTP GET request 522 that includes the data objects 516 and the parameter. As described in greater detail below, the intermediary device 504 may be configured to identify the parameter included in the HTTP GET request 522 and use the data objects 516 for generating an HTTP POST request 512' which corresponds to the unauthenticated HTTP POST request 512.

Where the client 502 is redirected to the authentication page, the authentication engine 510 may be configured to receive one or more credentials from the client 502 which are provided by the user. The credentials may be or include, for example, a username and password, a pin or alphanumeric code, a keyword, a biometric input, and so forth. In some embodiments, the credentials may be or include a plurality of credentials for multi-factor authentication. The user may provide the credentials to the authentication page via the browser 520 at the client 502. The client 502 may be configured to transmit the credentials to the authentication engine 510 for authenticating the user. The authentication engine 510 may be configured to receive the credential(s) from the client 502 for authenticating the user. The authentication engine 510 may be configured to authenticate the user based on the credential(s). The authentication engine 510 may be configured to cross-reference data corresponding to user credentials with the data received from the client 502. Where the authentication engine 510 identifies a matching data set which corresponds to a particular user, the authentication engine 510 may be configured to authenticate the user.

In some embodiments, the intermediary device 504 may be configured to generate a request to redirect the client to the information resource (such as a website, webpage, service, etc.) identified in the unauthenticated HTTP POST request 512. The intermediary device 504 may be configured to transmit the request to cause the client 502 to be redirected to the information resource. The information resource may be the original information resource which was attempted to be accessed via the unauthenticated HTTP POST request 512. In other words, the intermediary device 504 may be configured to redirect the client 502 back to the information resource identified in the unauthenticated HTTP POST request 512.

Once the user is authenticated, the client 502 may be configured to generate another request. For example, the client 502 may generate an HTTP GET request 522. In some embodiments, the client 502 may automatically generate the HTTP GET request 522 responsive to the user being authenticated. The client 502 may generate the HTTP GET request 522 and include the data objects 516 which are set as cookies for the browser 520. In some embodiments, the HTTP GET request 522 may further include the parameter which corresponds to the context data received with the request 518. The parameter may identify to the proxy engine 508 that the proxy engine 508 is to generate an authenticated HTTP POST request 512' which corresponds to the unauthenticated HTTP POST request 512.

The intermediary device 504 may be configured to receive the HTTP GET request 522 from the client 502. In some embodiments, the proxy engine 508 of the intermediary device 504 may be configured to receive the HTTP GET request 522. The proxy engine 508 may be configured to receive the HTTP GET request 522 following the authentication engine 510 authenticating the user. As noted above, the HTTP GET request 522 may include the parameter. The proxy engine 508 may be configured to use the parameter for identifying the contextual data stored in memory of the intermediary device 504 which corresponds to the HTTP POST request 512 (e.g., the unauthenticated HTTP POST request 512). The proxy engine 508 may be configured to use the parameter to determine that the proxy engine 508 is to generate an authenticated HTTP POST request 512' upon receiving the HTTP GET request 522.

The proxy engine 508 may be configured to generate the HTTP POST request 512'. The proxy engine 508 may be configured to use the data objects 516 included in the HTTP GET request 522 received from the client 502 for generating the authenticated HTTP POST request 512'. The proxy engine 508 may be configured to generate the HTTP POST request 512' by building, constructing, generating, or otherwise providing a post body 514' using the data objects 516. The proxy engine 508 may provide the post body 514' using each of the data objects 516 and their corresponding identifiers for reconstructing the post body 514 included in the unauthenticated HTTP POST request 512. Accordingly, the HTTP POST request 512' may be substantially the same as the unauthenticated HTTP POST request 512, and the post body 514' may be substantially the same as the post body 514.

In some embodiments, rather than generating a new HTTP request (e.g., a new HTTP POST request 512'), the proxy engine 508 may be configured to modify an identifying associated with the HTTP GET request 522 to an identifier which corresponds to HTTP POST requests. In other words, the proxy engine 508 may be configured to modify the HTTP GET request 522. The proxy engine 508 may be configured to generate the post body 514' using the data objects 516 as noted above. The proxy engine 508 may be configured to modify the HTTP GET request 522 to include the generated post body 514', to thereby re-create the unauthenticated HTTP POST request 512 as an authenticated HTTP POST request 512' with the post body 514'.

The intermediary device 504 may be configured to send, provide, communicate, or otherwise transmit the authenticated HTTP POST request 512' (e.g., with the POST body 514') to the server 506. In some embodiments, the intermediary device 504 may be configured to transmit the authenticated HTTP POST request 512' to the server 506 to cause the post body 514' to be posted to the server 506. Accordingly, the authenticated HTTP POST request 512' may be transmitted to the server 506 (e.g., to the information resource of the server 506) in accordance with (e.g., as specified in) the unauthenticated HTTP POST request 512. In some embodiments, the intermediary device 504 may be configured to redirect the client 502 to the information resource, and transmit the authenticated HTTP POST request 512' to the server 506. Accordingly, the post body 514 of the unauthenticated HTTP POST request 512 is conserved through storing the data objects 516 at the client 502 while the user is authenticated, and constructing an authenticated HTTP POST request 512' using the data objects 516 from the HTTP GET request 522.

Figure 6:
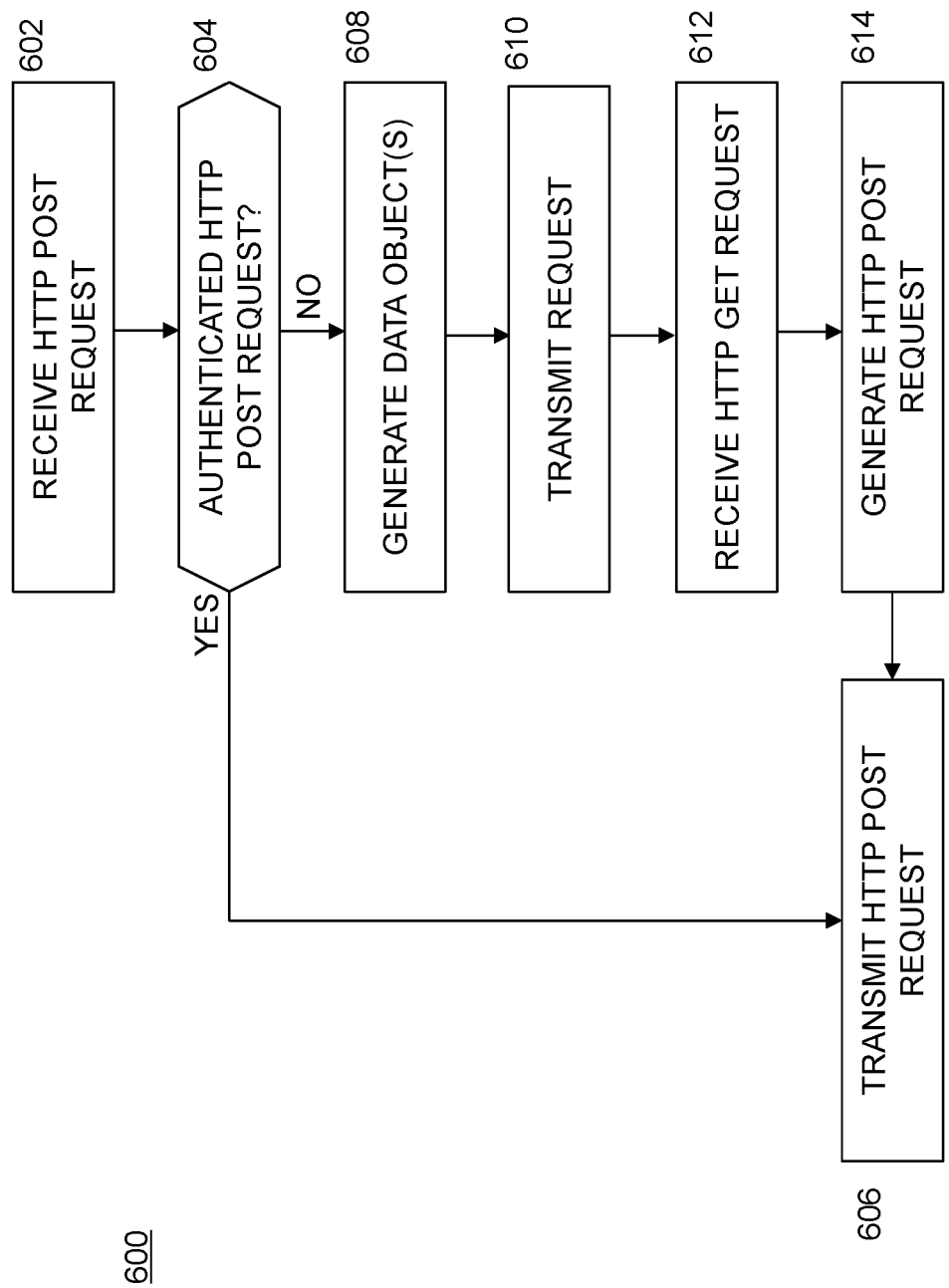
FIG. 6 is a flow diagram of a method for supporting unauthenticated POST requests, in accordance with an illustrative embodiment.

Referring to FIG. 6, depicted is a flowchart showing a method 600 of supporting unauthenticated POST requests, according to an illustrative embodiment. The method 600 (including various steps included therein) may be implemented by one or more of the components shown in FIG. 5 and described above, such as the intermediary device 504, the client(s) 502, and/or the server 506. As a brief overview, at step 602, a device receives an HTTP POST request. At step 604, the device determines whether the HTTP POST request is from an authenticated user. If the HTTP POST request is from an authenticated user, the method 600 proceeds to step 606 where the device transmits the HTTP POST request to a server. At step 608, where the HTTP POST request is from an authenticated user, the device generates data objects. At step 610, the device transmits a request. At step 612, the device receives an HTTP GET request. At step 614, the device generates an HTTP POST request. From step 614, the method 600 proceeds back to step 608.

At step 602, a device receives an HTTP POST request. The device may be arranged an intermediary to a client and a server. The device may receive the request from the client for the server. In some embodiments, the HTTP POST request received by the device at step 602 may be an unauthenticated HTTP POST request for the server. In some embodiments, the HTTP POST request may be an authenticated HTTP POST request. The HTTP POST request received at step 602 may include a body (e.g., to be posted at the server). In some embodiments, the HTTP POST request may identify an information resource, such as a website, webpage, a service, or other resource associated with the server. The HTTP POST request may include an address or identifier corresponding to the information resource (e.g., in the header for the HTTP POST request).

At step 604, the device determines whether the HTTP POST request is from an authenticated user. If the HTTP POST request is from an authenticated user, the method 600 proceeds to step 606 where the device transmits the HTTP POST request to a server. In some embodiments, the device may determine whether the HTTP POST request is from an authenticated user (e.g., an authenticated HTTP POST request) based on data from the HTTP POST request received at step 602. The device may parse the HTTP POST request to determine whether the HTTP POST request includes a session identifier or other data included in the header which identifies the HTTP POST request as being an associated with an authenticated user. Where the HTTP POST request is associated with an authenticated user, the method 600 may proceed to step 606. However, where the HTTP POST request is associated with an unauthenticated user, the method 600 may proceed to step 608.

At step 608, where the HTTP POST request is from an authenticated user, the device generates data objects. In some embodiments, the data objects may be cookies to be stored at the browser of the client. In some embodiments, the device may generate one or more data objects for the body of the unauthenticated HTTP POST request. In some embodiments, the device may generate a plurality of data objects. For example, the data objects may have a maximum size (e.g., a maximum data object size). The device may generate a plurality of data objects where the post body of the unauthenticated HTTP POST request has a size which exceeds the maximum data object size. The device may generate the plurality of data objects by dividing the body of the unauthenticated HTTP POST request into the plurality of data objects.

In some embodiments, the device may store context data in memory which corresponds to the unauthenticated HTTP POST request. The device may generate and store the context data based on the unauthenticated HTTP POST request. For example, the context data may include a session identifier corresponding to a connection between the client and device, an indicator which indicates an HTTP request type (e.g., that the unauthenticated HTTP POST request is an HTTP POST request), and so forth. The device may store the context data responsive to determining that the HTTP POST is an unauthenticated HTTP POST request.

At step 610, the device transmits a request. In some embodiments, the device may transmit the request to the client. In some embodiments, the request may be a request to cause an authentication of the user. The request may include the one or more data objects generated at step 608. In some embodiments, the request may include a parameter which indicates that the device is to generate the authenticated HTTP POST request from the HTTP GET request. In some embodiments, the request may be a redirect request (such as an HTTP 302 redirect) which redirects the client to an authentication page associated with the device (or a device which is associated with authenticating a user). The device may transmit the request and data objects to the client to cause a user of the client to authenticate themselves.

In some embodiments, such as where the device both serves as a proxy for the client and authenticates users of the clients, the request may redirect the client to an authentication page corresponding to the device. The device may receive one or more credentials for authenticating the user from the client based on data provided by the user to the client. The device may receive the credentials responsive to transmitting the request at step 610. The one or more credentials received from the client may be, for example, a username and password, biometric data, a pin or passcode, etc. The device may authenticate the user based on the credentials received from the client. Once the device authenticates the user, the device may generate a request to redirect the client back to the information resource identified in the unauthenticated HTTP POST request. The device may transmit the request to the client to cause the client to be redirected to the information resource.

At step 612, the device receives an HTTP GET request. In some embodiments, the device may receive an HTTP GET request responsive to authenticating the user. The HTTP GET request may include the data objects stored on the client. In some embodiments, the client may automatically generate the HTTP GET request responsive to receiving the redirect request from the device. In some embodiments, the HTTP GET request includes the parameter received responsive to authenticating the user. The parameter may correspond to the context data and may be used to generate an authenticated HTTP POST request.

At step 614, the device generates an HTTP POST request. In some embodiments, the device may generate an authenticated HTTP POST request corresponding to the unauthenticated HTTP POST request (e.g., received at step 602) using the one or more data objects included in the HTTP GET request (e.g., received at step 612). In some embodiments, the device may generate the authenticated HTTP POST request by modifying an identifier of the HTTP GET request which corresponds to HTTP GET requests to an identifier which corresponds to HTTP POST requests.

From step 614, the method 600 proceeds back to step 608. At step 608, the device may transmit the HTTP POST request. The device may transmit an authenticated HTTP POST request to the server. The authenticated HTTP POST request may be the HTTP POST request received at step 602 (which is determined to be an authenticated HTTP POST request at step 604) or the HTTP POST request generated at step 614 (which was generated from the HTTP GET request received at step 612). The device may transmit the HTTP POST request to the information resource specified in the HTTP POST request received at step 602.

Figure 7:
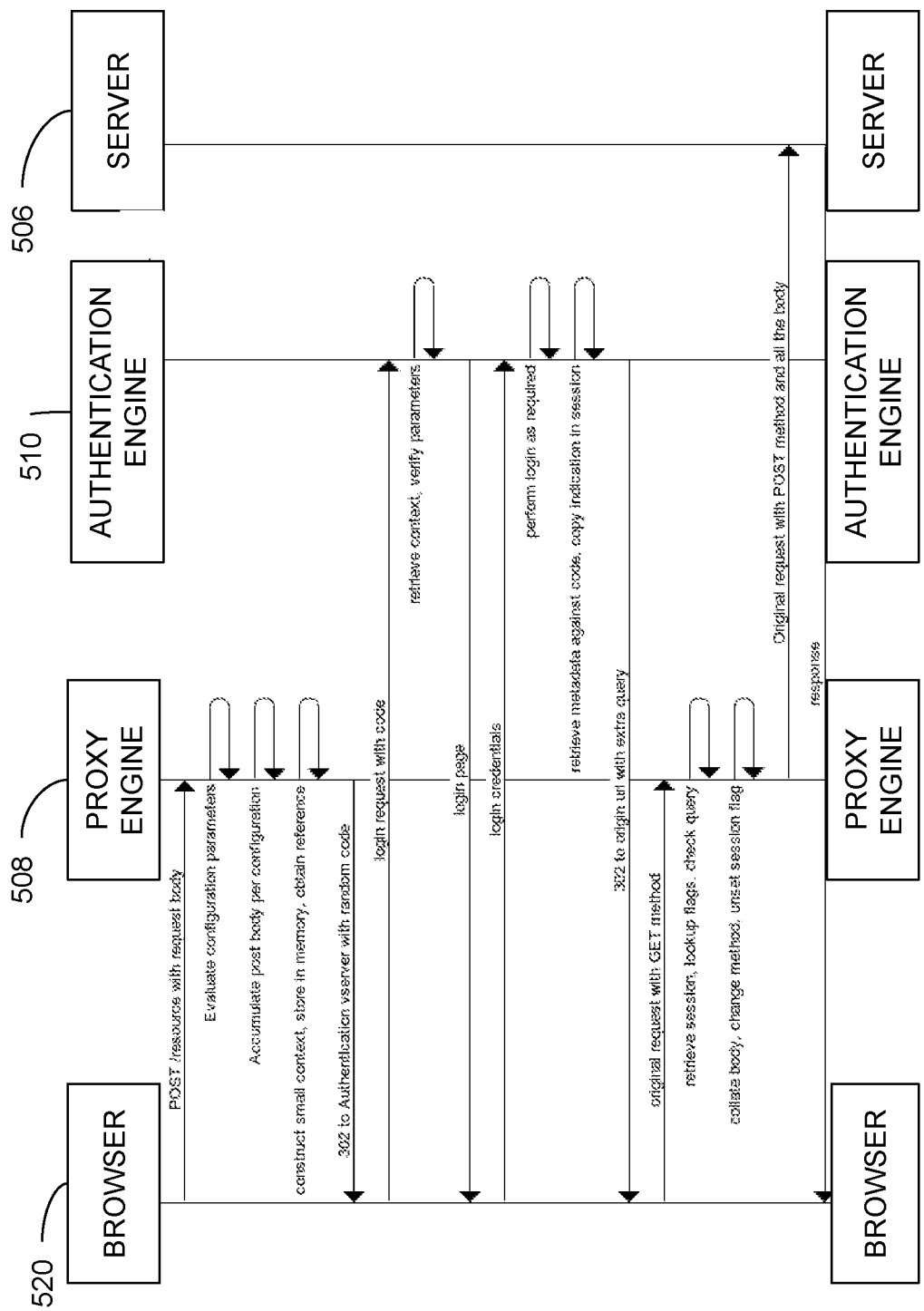
FIG. 7 is a flow diagram showing efficient handling of unauthenticated POST requests in an intermediary device, in accordance with an illustrative embodiment.

Referring now to FIG. 7, depicted is a flowchart 700 showing the system 500 of FIG. 5 providing efficient handling of unauthenticated POST requests through one or more intermediary devices, according to an illustrative embodiment. As shown in FIG. 7, a client executing a browser 520 may transmit an HTTP POST request with a request body to a proxy engine 508. The proxy engine 508 may be implemented on an intermediary device, such as the intermediary device 504 shown in FIG. 5. The proxy engine 508 may evaluate configuration parameters associated with the HTTP POST request from the browser 520 to determine whether the HTTP POST request is from an authenticated user. Where the proxy engine 508 determines that the HTTP POST request is from an unauthenticated user, the proxy engine 508 may accumulate the post body from the HTTP POST request according to the configuration parameters. The proxy engine 508 may generate, build, or otherwise construct a small context corresponding to browser 520 and/or client which is to be stored on memory along with a reference. The proxy engine 508 may transmit a HTTP 302 redirect to the browser 520 for redirecting the browser 520 to the authentication engine 510. The HTTP 302 redirect may include the reference and data corresponding to the post body, such as data objects or cookies which together form or correspond to the post body.

When the browser receives the HTTP 302 redirect, the browser may provide a login request with the reference to the authentication engine 510. The authentication engine 510 may use the reference for retrieving the context associated with the browser 520 and/or client, and may verify the parameters corresponding to the browser 520 match the parameters received with the HTTP POST request. The authentication engine 510 may provide a login page to the browser 520 for rendering. The user may provide the login credentials to the authentication engine 510 via the login page. The authentication engine 510 may perform login as required, and may retrieve metadata using the reference and copy an indication (or flag, or extra query) for the session. The authentication engine 510 may transmit an HTTP 302 redirect to the original uniform resource locator (URL) corresponding to the HTTP POST request. The HTTP 302 redirect may include the indication or extra query for receipt by the browser.

The browser 520 may transmit an HTTP GET request to the proxy engine 508 (e.g., with the indication or extra query). The HTTP GET request may also include the data objects which were stored as cookies at the browser 520. The proxy engine 508 may retrieve the session using the indication or extra query, lookup a flag which corresponds to the session and indicates that the proxy engine 508 is to generate an HTTP POST request from the HTTP GET request. The proxy engine 508 may construct, build, generate, or otherwise collage the body from the data objects included in the HTTP GET request. The proxy engine 508 may switch the method of the HTTP request from an HTTP GET request to an HTTP POST request, and unset the session flag. The proxy engine 508 may transmit the HTTP POST request to the server 508 with the body, and the server 506 may transmit a response back to the browser 520 (e.g., through the proxy engine 508 or directly to the browser 520).

In one specific implementation of the flow shown in FIG. 7, whenever an unauthenticated POST request arrives at the proxy engine (or a traffic management virtual server), the traffic management virtual server will check for configuration that controls handling of the POST requests. Based on the configuration, the intermediary device that includes or otherwise executes the traffic management virtual server will start accumulating the desired data.

Once the data has been accumulated, the intermediary device can set this data as a cookie. However, most browsers do not handle cookies of more than 4096 bytes. Therefore, the intermediary device can be configured to split the data into multiple cookies and set all of them on the browser.

Along with setting the cookie, the traffic management virtual server can also store the indication that the first request is a POST request in memory. The traffic management virtual server can also store the virtual server unique identifier and several other parameters in the memory in order to prevent storing sensitive information in the browser.

The traffic management virtual server can then get a one-time reference for this information stored in the memory. The traffic management virtual server can send this information along with a corresponding 302 request, which also sets cookies.

The authentication virtual server can process a one-time code, validate the reference and all the parameters thereby. The authentication virtual server can then redirect the user to the authentication page and preserve the one time code for future use.

Once authentication is complete, the authentication virtual server can retrieve the information associated with the one time code. The authentication virtual server can identify from the previously stored indication that the initial request was a POST request.

The authentication virtual server can then indicate that the session needs to process first request as a POST request. The authentication virtual server can then redirect the user back to the origin URL at the traffic management virtual server. However, since the original request is a POST request, the authentication virtual server can add an extra query parameter at the end of the URL. This query parameter will serve as an indication to the traffic management virtual server to process the body.

When traffic management virtual server gets the redirect, the traffic management virtual server looks for the session indication, and also the query parameter to confirm the same. A combination of the session indication and the query parameter can be used to avoid both race conditions and also malicious injection of query parameters by attackers. The traffic management virtual server can strip or remove the extra context from the URL, collate the body from the different cookie values, modify the HTTP method to POST and proxy the data to the backend server. The backend server can then see or identify the data in its entirety and is unaware of any processing that happened at the proxy.

While the embodiments described herein show one possible implementation of the present solution, it is noted that other possible implementations may be used for conserving a post body from an HTTP POST request. For instance, when an unauthenticated HTTP POST request arrives at the intermediary device, the intermediary device may allocate a complete session for the client. Such embodiments may avoid setting cookies at the client, but could result in various attacks (such as a DoS attack), since any arbitrary request may allocate a session on the intermediary device. Another approach may include redirecting the client following authentication to a dedicated uniform resource locator (URL) for reconstructing the post body of the HTTP POST request. The dedicated URL may transmit a redirect to the original information resource (such as an 200 OK message) which automatically posts the post body corresponding to the unauthenticated HTTP POST request. However, such embodiments may have an additional round-trip of requests, and is therefore more efficient. According to still another embodiment, upon receiving the HTTP GET request following authentication, the intermediary device may process the HTTP GET request as a special endpoint, and convert the request method (e.g., from an HTTP GET request to an HTTP POST request). However, such an implementation may result in a problem where the server response with relative links to parents (e.g., /path/resource).

Various elements, which are described herein in the context of one or more embodiments, may be provided separately or in any suitable sub-combination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

I claim:

1. A method comprising:
receiving, by a device intermediary to a client and a server, from the client, an unauthenticated HTTP POST request for the server, the unauthenticated HTTP POST request including a body;
generating, by the device, one more data objects for the body of the unauthenticated HTTP POST request;
transmitting, by the device, to the client, a request to cause an authentication of a user, the request including the one or more data objects to be stored on the client;
receiving, by the device, responsive to authenticating the user, from the client, an HTTP GET request including the one or more data objects stored on the client;
generating, by the device, an authenticated HTTP POST request corresponding to the unauthenticated HTTP POST request, the authenticated HTTP post request including the body identified using the one or more data objects included in the HTTP GET request; and
transmitting, by the device, to the server, the authenticated HTTP POST request.

2. The method of claim 1, further comprising determining, by the device, based on the unauthenticated HTTP post request, that the user is unauthenticated, wherein generating the one or more data objects and transmitting the request is performed responsive to determining that the user is unauthenticated.

3. The method of claim 1, further comprising storing, by the device, in memory of the device, context data including a session identifier corresponding to the unauthenticated HTTP POST request and an indicator indicating that the unauthenticated HTTP POST request is an HTTP POST request.

4. The method of claim 3, wherein the HTTP GET request includes a parameter received responsive to authenticating the user, the parameter corresponding to the context data and used to generate the authenticated HTTP POST request.

5. The method of claim 1, wherein the request to cause the authentication of the user is a first request, the method further comprising:
receiving, by the device from the client, responsive to the request to cause the authentication of the user, one or more credentials for authenticating the user; and
authenticating, by the device, the user based on the one or more credentials.

6. The method of claim 1, wherein the unauthenticated HTTP POST request identifies an information resource, the method further comprising:
generating, by the device, responsive to authenticating the user, a request to redirect the client to the information resource identified in the unauthenticated HTTP POST request; and
transmitting, by the device, to the client, the request to cause the client to be redirected to the information resource.

7. The method of claim 1, wherein the request to cause the authentication of the user includes a parameter which indicates that the device is to generate the authenticated HTTP POST request from the HTTP GET request.

8. The method of claim 1, wherein the one or more data objects is a plurality of data objects, wherein the body of the unauthenticated HTTP POST request has a size which exceeds a maximum size of a data object of the plurality of data objects, and wherein generating the plurality of data objects comprises:
dividing, by the device, the body of the unauthenticated HTTP POST request into the plurality of data objects.

9. The method of claim 8, wherein the plurality of data objects is a plurality of cookies, the method further comprising:
setting, by the device, the plurality of cookies on a browser of the client.

10. The method of claim 1, wherein generating the authenticated HTTP POST request comprises modifying, by the device, an identifier of the HTTP GET request which corresponds to HTTP GET requests to an identifier which corresponds to HTTP POST requests.

11. A system comprising:
a device intermediary to a client and a server, the device comprising one or more processors and memory, the device configured to:
receive, from the client, an unauthenticated HTTP POST request for the server, the unauthenticated HTTP POST request including a body;
generate one more data objects for the body of the unauthenticated HTTP POST request;
transmit, to the client, a request to cause an authentication of a user, the request including the one or more data objects to be stored on the client;
receive, responsive to authenticating the user, from the client, an HTTP GET request including the one or more data objects stored on the client;
generate an authenticated HTTP POST request corresponding to the unauthenticated HTTP POST request, the authenticated HTTP post request including the body identified using the one or more data objects included in the HTTP GET request; and
transmit, to the server, the authenticated HTTP POST request.

12. The system of claim 11, wherein the device is further configured to determine, based on the unauthenticated HTTP post request, that the user is unauthenticated, wherein generating the one or more data objects and transmitting the request is performed responsive to determining that the user is unauthenticated.

13. The system of claim 11, wherein the device is further configured to store, in memory of the device, context data including a session identifier corresponding to the unauthenticated HTTP POST request and an indicator indicating that the unauthenticated HTTP POST request is an HTTP POST request.

14. The system of claim 13, wherein the HTTP GET request includes a parameter received responsive to authenticating the user, the parameter corresponding to the context data and used to generate the authenticated HTTP POST request.

15. The system of claim 11, wherein the request to cause the authentication of the user is a first request, and wherein the device is further configured to:
receive, from the client, responsive to the request to cause the authentication of the user, one or more credentials for authenticating the user; and
authenticate the user based on the one or more credentials.

16. The system of claim 11, wherein the unauthenticated HTTP POST request identifies an information resource, and wherein the device is further configured to:
generate, responsive to authenticating the user, a request to redirect the client to the information resource identified in the unauthenticated HTTP POST request; and
transmit, to the client, the request to cause the client to be redirected to the information resource.

17. The system of claim 11, wherein the request to cause the authentication of the user includes a parameter which indicates that the device is to generate the authenticated HTTP POST request from the HTTP GET request.

18. The system of claim 11, wherein the one or more data objects is a plurality of data objects, wherein the body of the unauthenticated HTTP POST request has a size which exceeds a maximum size of a data object of the plurality of data objects, and wherein generating the plurality of data objects comprises:
dividing the body of the unauthenticated HTTP POST request into the plurality of data objects.

19. The system of claim 18, wherein the plurality of data objects is a plurality of cookies, and wherein the device is further configured to:
set the plurality of cookies on a browser of the client.

20. A non-transitory computer readable medium storing program instructions for causing one or more processors to:
receive, from a client, an unauthenticated HTTP POST request for a server, the unauthenticated HTTP POST request including a body;
generate one more data objects for the body of the unauthenticated HTTP post request;
transmit, to the client, a request to cause an authentication of a user, the request including the one or more data objects to be stored on the client;
receive, responsive to authenticating the user, from the client, an HTTP GET request including the one or more data objects stored on the client;

generate an authenticated HTTP POST request corresponding to the unauthenticated HTTP post request, the authenticated HTTP post request including the body identified using the one or more data objects included in the HTTP GET request; and transmit, to the server, the authenticated HTTP POST request.

\* \* \* \* \*